United States Patent
Alexander et al.

(10) Patent No.: US 10,565,265 B2
(45) Date of Patent: Feb. 18, 2020

(54) ACCOUNTING FOR POSITIONAL BIAS IN A DOCUMENT RETRIEVAL SYSTEM USING MACHINE LEARNING

(71) Applicant: salesforce.com, inc., San Francisco, CA (US)

(72) Inventors: Zachary Alexander, Snoqualmie, WA (US); Scott Thurston Rickard, Jr., Bellevue, WA (US); Clifford Z. Huang, Seattle, WA (US); J. Justin Donaldson, Seattle, WA (US)

(73) Assignee: salesforce.com, inc., San Francisco, CA (US)

( * ) Notice: Subject to any disclaimer, the term of this patent is extended or adjusted under 35 U.S.C. 154(b) by 214 days.

(21) Appl. No.: 15/292,033

(22) Filed: Oct. 12, 2016

(65) Prior Publication Data

US 2018/0101534 A1 Apr. 12, 2018

(51) Int. Cl.
*G06F 17/30* (2006.01)
*G06F 16/93* (2019.01)

(52) U.S. Cl.
CPC .................................. *G06F 16/93* (2019.01)

(58) Field of Classification Search
CPC ....................................................... G06F 16/93
See application file for complete search history.

(56) References Cited

U.S. PATENT DOCUMENTS

| | | | |
|---|---|---|---|
| 2011/0016106 A1* | 1/2011 | Xia | G06F 16/29 707/706 |
| 2014/0149429 A1* | 5/2014 | Gao | G06F 17/30702 707/749 |
| 2015/0293976 A1* | 10/2015 | Guo | G06F 17/30554 707/706 |
| 2016/0078133 A1* | 3/2016 | Santhanam | G06F 17/30991 707/734 |

OTHER PUBLICATIONS

Chen et al., Beyond Ten Blue Links: Enabling User Click Modeling in Federated Web Search, WSDM '12, Feb. 8-12, 2012, retrieved on Aug. 13, 2019, retrieved from the Internet <URL: https://dl.acm.org/citation.cfm?id=2124351> (Year: 2012).*

Dumais et al., Individual differences in gaze patterns for web search, Proceedings of the third symposium on Information Interactions in context, p. 185-194, 2010, retrieved on Aug. 13, 2019, retrieved from the Internet <URL: https://dl.acm.org/citation.cfm?id=1840812> (Year: 2010).*

Mowshowitz, et al., Assessing bias in search engines, Information Processing & Management, vol. 38, Iss. 1, Jan. 2002, pp. 141-156, retrieved on Aug. 13, 2019, retrieved from the Internet <URL: https://www.sciencedirect.com/science/article/pii/S0306457301000206> (Year: 2002).*

* cited by examiner

*Primary Examiner* — Tyler J Torgrimson
(74) *Attorney, Agent, or Firm* — Fenwick & West LLP

(57) ABSTRACT

A document retrieval system tracks user selections of documents from query search results and uses the selections as proxies for manual user labeling of document relevance. The system trains a model representing the significance of dif- (Continued)

ferent document features when calculating true document relevance for users. To factor in positional biases inherent in user selections in search results, the system learns positional bias values for different search result positions, such that the positional bias values are accounted for when computing document feature features that are used to compute true document relevance.

9 Claims, 5 Drawing Sheets

ACCOUNTING FOR POSITIONAL BIAS IN A DOCUMENT RETRIEVAL SYSTEM USING MACHINE LEARNING

FIELD OF ART

The present invention generally relates to the field of information retrieval, and more specifically, to using machine learning in document retrieval systems to enable computation of more accurate document relevance scores by accounting for positional biases of users.

BACKGROUND

Document retrieval systems, such as search engines, are designed to receive a search query and output a set of search results that are most relevant to the search query, ranking the documents according to their relevance.

Accordingly, a document retrieval system must be able to compute the relevance of a given search result item (hereinafter "document") to a given search query. In some systems, such a relevance score is computed as a combination of a set of different feature values expressing how strongly a given document embodies the document feature in question, such as a "number of viewings" feature expressing how many times a given document has been viewed, or a "token occurrence" feature expressing how many times a token of the search query appears in content of the document.

In practice, different features will contribute in different degrees to the overall relevance of documents, and hence such systems will need to weight the different features appropriately when computing the overall relevance score for a document. For example, in practice the "token occurrence" feature might influence overall document relevance more strongly than the "number of viewings" feature, in which case the "token occurrence" feature should be weighted more highly than the "number of viewings" feature. Thus, the appropriate weights to use for different features will need to be determined.

One approach to determining the appropriate feature weights might be to employ some users of the system to manually specify, for each document in a set of search results, how relevant the user considers the document to be (e.g., "highly relevant", "somewhat relevant", etc.). However, such manual document relevance specification would take an enormous of human effort, thus requiring considerable time and expense.

SUMMARY

A relevance learning module of a document retrieval system employs supervised machine learning to learn how to weight different document features in order to best calculate the relevance score of a given document to match the expected true relevance of that document for users. More specifically, rather than employing a set of users to manually specify relevances of documents, the relevance learning module uses the user clicks or other runtime selections of particular documents in the search results as implicit proxies for explicit relevance specifications.

However, the order in which the documents are presented in the search results tends to influence the document(s) that the users select. For example, higher-ranking documents presented to users at a higher position within the search results tend to be selected more frequently than lower-ranking documents presented at lower positions. Thus, even if a given user would find two documents to be of equal relevance if the user considered both documents equally, the user would more likely select whichever document were presented at a higher position in the search results. This phenomenon, hereinafter referred to as "positional bias," means that the user selections of documents in the search results are not perfectly representative of the actual relevance of the documents to the users, since the selections are a function not only of the objective relevance of the documents to the users when taken in isolation from other documents, but also of the subjective positional bias induced by the position at which the documents are presented in the search results relative to other documents.

Accordingly, in order to learn how to compute true document relevance, the relevance learning module trains a model that distinguishes true document relevance from positional bias when accounting for observed document selections within search results (e.g., document click counts). In one embodiment, the model is based on the assumptions that (1) the probability that a document is truly relevant to a given query is a logistic function of the document features, and (2) the odds that a user selects a given document is equal to the odds that the document is the most relevant, scaled by a constant factor according to a position within the search results at which the document was shown to the user. A neural network can be used to realize a system embodying the above model. The use of a neural network further allows relaxing the above assumptions, allowing an extension of the system to handle non-linearity.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
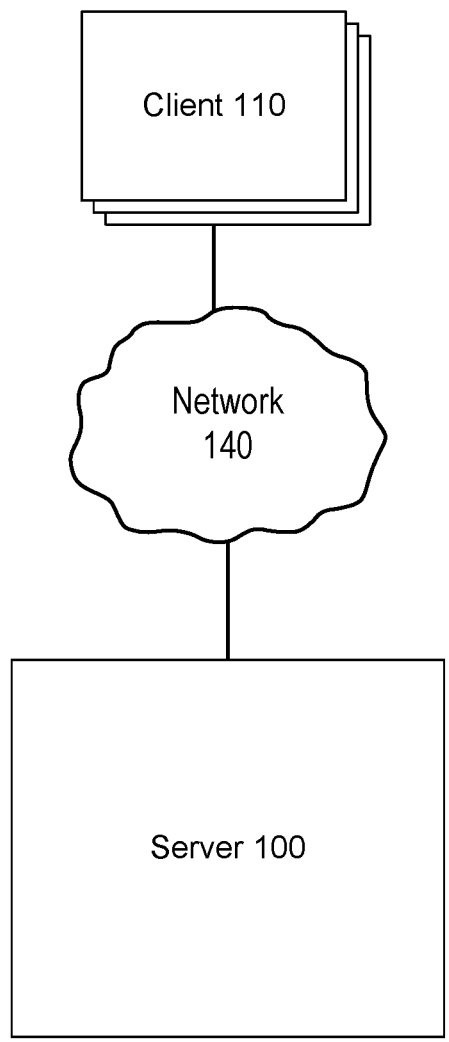
FIG. 1 illustrates an environment in which electronic document retrieval takes place, according to one embodiment.

FIG. 1 illustrates an environment in which electronic document retrieval takes place, according to one embodiment. Users use client devices 110 to query a document retrieval server 100 for relevant documents. The document retrieval server 100 accordingly provides the querying clients with search results indicating documents that are most relevant to the user queries. In order to be able to provide the most relevant documents to users in response to queries, prior user document selections from search results are analyzed (e.g., by the document retrieval server 100) to learn how to calculate true document relevance, accounting for the positional biases inherent in search result ordering.

The client devices 110 are computing devices such as laptop computers, desktop computers, tablet computers, smart phones, or any other device that can communicate with the server 100 over a network 140. The various users use the client devices 110 to search for and view documents, such as submitting search queries to the server 100, displaying the search results in response to the queries, viewing documents listed in the search results, and the like.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

The server 100 receives user queries and returns result sets of documents that it determines are relevant with respect to the user queries. The "documents" are discrete semantic units of electronic content, and in different embodiments may be stored either by the server 100 itself, or by separate systems accessible over the network 140. In different embodiments the documents may include web pages, word processing files, and/or multimedia files with textual aspects (e.g., digital videos with textual metadata).

Figure 2:
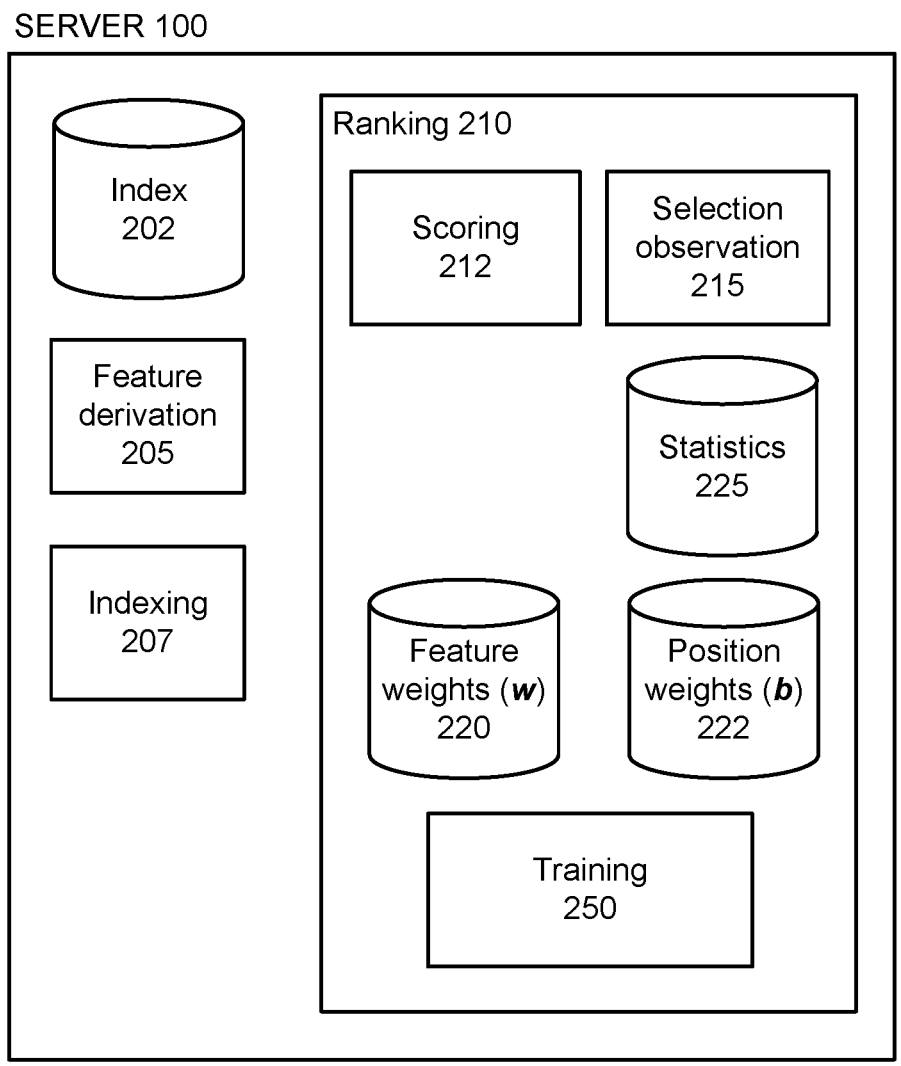
FIG. 2 provides details of the server of FIG. 1, according to one embodiment.

Details of the server 100 are now provided with respect to FIG. 2. In some embodiments, one or more aspects of the server illustrated in FIG. 2 are had or performed by a separate system—that is, some of the functionality illustrated in FIG. 2 may additionally and/or alternatively belong to a separate system. For example, training could take place on a separate system, with the server 100 applying the results of the training.

The document retrieval server 100 has a search index 202 that it uses when identifying the most relevant documents for a given user search query. The search index 202 is a data structure containing a set of possible "query components" (e.g., entire textual query strings, or portions thereof, such as individual word tokens) and documents that have been found to be relevant to those query components. In one embodiment, for each query component, and for each document associated with that query component, the search index 202 additionally stores, for each of a set of document features, a value of that document feature for the document. The value for a document feature expresses how strongly the document embodies that feature, such as a "number of viewings" feature expressing how many times a given document has been viewed, or a "token occurrence" feature expressing how many times a token of the search query appears in content of the document. As one specific example, the search index 202 might contain an entry for the word token "payroll" (the query component), a list of documents previously determined to contain the word "payroll", and for each document, values for the "number of viewings" feature expressing how many times the document has been viewed by any user and for the "token occurrence" feature expressing how many times the word "payroll" occurs in the document, as well as other features.

The server 100 includes a feature extraction module 205 that extracts feature values for a given document for each of the document features to be analyzed. In one embodiment, the document features include the number of times a query component appears in the document content, the number of times a query component appears in the title of the document, and the number of times that the document has been viewed by any user, though it is understood that the exact set of document features can vary in different embodiments. Other features used in some embodiments include, but are not limited to, time since last activity, time since last modification, number of links to child pages (e.g., where the documents are web pages), and number of distinct users that have viewed the document. Some of the document features have values that are determined based only on the document itself (e.g., the number of times that the document has been viewed); other document features have values that are determined based on the relationship of the document and a query component corresponding to the document feature (e.g., the number of times that the particular query component appears in the document content). In some embodiments the feature extraction module 205 initially determines the value for a document feature of a document by analyzing the document itself and then stores the value in the index 202 in association with the document; thereafter, the feature extraction module determines the document feature value simply by looking up the value within the index 202.

In some embodiments, the server 100 includes an indexing component 207 that constructs the index 202. The indexing component 207 obtains access to the content of the documents to be indexed (and any metadata of those documents, such as document title, tags, etc.), determines for some set of query components which documents match those query components (e.g., which documents contain the query component text), uses the feature extraction module 205 to perform the initial determination of the document feature values for those documents, and stores the values in the index 202 in association with the appropriate query components and matching documents.

The server 100 also includes a ranking module 210 that determines how to rank a set of documents based on relevance. The ranking module 210 also includes functionality that allows it to learn how to perform the relevance ranking based on analysis of prior user selections of documents within ranked search results.

The ranking module 210 uses a scoring module 212 to compute relevance scores for documents with respect to search queries and query components. For a given document, the scoring module obtains the values of the document features, e.g., from the index 202. Since in practice the different document features typically have different degrees of influence on the relevance of documents, the server 100 further stores a set of feature weights 220 that correspond to the different document features, and the scoring module 212 applies these feature weights to the document feature values when computing the score for a <document, query component> pair. Each document feature has a corresponding feature weight. Thus, if the server 100 tracks three document features, $f_1$, $f_2$, and $f_3$, then there will be three corresponding feature weights, $w_1$, $w_2$, and $w_3$. (The values for the feature weights are learned by a training module 250, as described later below.) The scoring module 212 combines the different weighted document feature values for a <document, query component> pair into a single score. For example, in one embodiment the score s for a given document with respect to a given query component is computed as: $s = \Sigma_i (w_1 * f_1)$. To compute the score for a document with respect to a search query having multiple query components, the scoring module 212 computes and combines the scores for the document with respect to each of the query components within the search query.

The ranking module 210 for a given search query ranks the different documents that match the search query (as indicated by the search index 202) based on the document scores determined by the scoring module 212. The ranking module 210 provides the search result set of ranked documents for the given search query to the querying client device 110, in the determined rank order. The querying user may then select documents from the search results.

A selection observation module 215 observes, and records in a statistics repository 225, the selection(s) of documents from the search results provided to the querying users. Specifically, the selection observation module 215 stores, for each selection, query data including an indication of the selected document (e.g., an identifier of the document, the values for the document's features, or both) and of the position of the document in the search results in which it was selected. The statistics repository 225 is analyzed when learning to compute actual document relevance.

A training module 250 learns the feature weights 220 that the scoring module 212 applies when computing actual document relevances by evaluating the document selection data in the statistics repository 225.

In one embodiment, the training module 250 operates according to a probabilistic model of whether a user will select a given document from the search results for a search query, relying on two assumptions: (1) the probability that a given document is truly relevant to the search query is a logistic function of the document feature values, and (2) the odds that a user selects a given document is equal to the probability that the given document is the most relevant, but scaled by a constant factor according to the position at which the document was shown to the user. The following equations explain the derivation of mathematical relationships that the training module 250 uses to model document selection probabilities.

(1) Probability that a Given Document is Relevant to a Search Query

The probability that a given document from a search results is relevant to a given search query may be expressed using the logistic function:

$$P_j = P(\text{relevant}|q, D_j; w) = 1/(1 + e^{-wT*sj}) \quad \text{(Eq'n 1)}$$

where $P_j$ is the probability that the $j^{th}$ document in the search results is relevant to the query; q is the search query; $D_j$ is the $j^{th}$ document; w represents the k parameters of the model, $<w_1, \ldots, w_k>$, for each of the k document features; and $s_j$ represents the k measures of relevance for a document, $<s_1, \ldots, s_k>$.

(2) Probability that a Given Document is Most Relevant to a Search Query

The probability that a given document from the search results is the most relevant of all of the n documents in the search results can be determined by normalizing the probability that that document is relevant with respect to the probabilities that the other documents are relevant. This may be expressed as:

$$R_j = P(j \text{ most relevant}|q,(D_1, \ldots, D_n);w) = P_j/\Sigma_{[i=1,n]} P_i = e^{wT*sj}/\Sigma_{[i=1,n]} e^{wT*si} \quad \text{(Eq'n 2)}$$

(3) Adjusting the Probabilities to Account for Positional Bias

Assuming that the odds of a user selecting $D_j$ (the $j^{th}$ document) is equal to the odds of $D_j$ being the most relevant document, but scaled by a constant rank bias $b_j$, then:

$$\frac{P(\text{document } j \text{ is selected})}{1 - P(\text{document } j \text{ is selected})} = b_j * \frac{P(\text{document } j \text{ is most relevant})}{1 - P(\text{document } j \text{ is most relevant})} \quad \text{(Eq'n 3)}$$

The probability that the $j^{th}$ document in the search results will be selected, $M_j$, is:

$$M_j = P(\text{selection of document } j|q,(D_1, \ldots, D_n);w,b) = e^{wT*sj+bj}/\Sigma_{[i=1,n]} e^{wT*si+bi} \quad \text{(Eq'n 4)}$$

where b represents the rank bias values for each of the n documents/positions in the search results, $<b_1, \ldots, b_n>$.

Equation 4 represents a complete probabilistic model for whether a user selects a given document in the search results, as a function of both (a) the document features returned by the feature extraction module 205, and (b) the position of the document within the ordering of the search results. The training module 250 analyzes the document selection data in the statistics repository 225 and solves for the model parameters w (feature weights 220) and b (position weights 222) in Equation 4, such that w and b minimize $M_j$. In one embodiment, maximum likelihood estimation is used to find w and b.

Probabilistic Neural Network for Linear Model

Figure 3A:
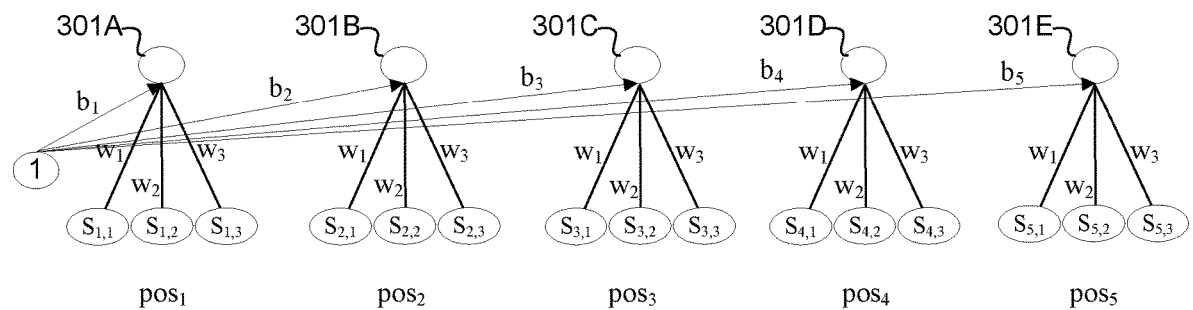
FIGS. 3A and 3B illustrated two different example neural network architectures for deriving trained models, according to some embodiments.

In one embodiment, Equation 4 is embodied using a neural network architecture, as illustrated in the example of FIG. 3A. FIG. 3A shows the example of a document retrieval system that shows 5 ordered results to a user in response to a query and that tracks 3 features per document, and hence has 5 positions ($pos_1$, $pos_2$, $pos_3$, $pos_4$, and $pos_5$), each with a corresponding positional bias value ($b_1$, $b_2$, $b_3$, $b_4$, and $b_5$) and a document to be displayed, each document having three document feature values ($s_{d,1}$, $s_{d,2}$, and $S_{d,3}$ for each document d) that are weighted by the feature weights ($w_1$, $w_2$, and $w_3$). The document feature values for each document are combined into true relevance scores for that document by combining the document feature values s with the feature weights w and adjusting that score by adding the constant positional bias value $b_i$ based on the position i at which the document was shown. (For example, $b_1$ is the positional bias value corresponding to a first position and so is added to the score for the first document, which is displayed in the first position.) The adjusted scores for each document, $(w^T*s_i)+b_i$, are combined by normalizing the probabilities (a softmax function) so that the activation at each node in the second layer (i.e., nodes 301) represents the probability that a particular corresponding document was selected. In addition, the statistics 225 store, for each presentation of search results to a user, which documents were actually selected. (In embodiments in which only a first document selected is logged, a one-hot encoding may be used to identify the particular document that was selected.) In some embodiments, cross-entropy (negative-log likelihood as in Equation 4) is employed as the loss function, and solving for the model parameters w and b results in model parameters that maximize the probability of the known data—that is, that the documents known to have been selected in response to given search queries would in fact be selected by model for those queries.

Extension to Nonlinear Model

Figure 3B:
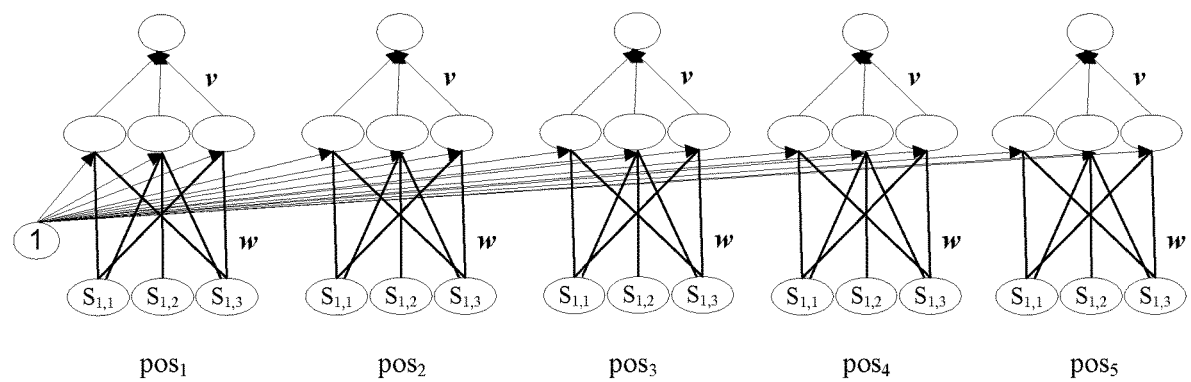

The use of a neural network architecture such as that illustrated in the example of FIG. 3B allows the model to be made more flexible, e.g., to handle nonlinear ranking functions, and/or nonlinear interactions between relevance and positional bias, by adding hidden layers to the neural network. For example, in one embodiment assumptions (1) and (2) above (i.e., that relevance is a logistic function of the document feature values, and the probability that a user selects a given document is equal to the probability that the given document is the most relevant, scaled by a constant factor according to document selection position) are relaxed, such that given a sufficiently complex neural network architecture, a nonlinear model can represent any relationship between document features and positional bias. True relevance can still be separated from positional bias, since w and v are the same for each result. The ranking function in this example would be v·sigmoid(w·s).

Figure 4:
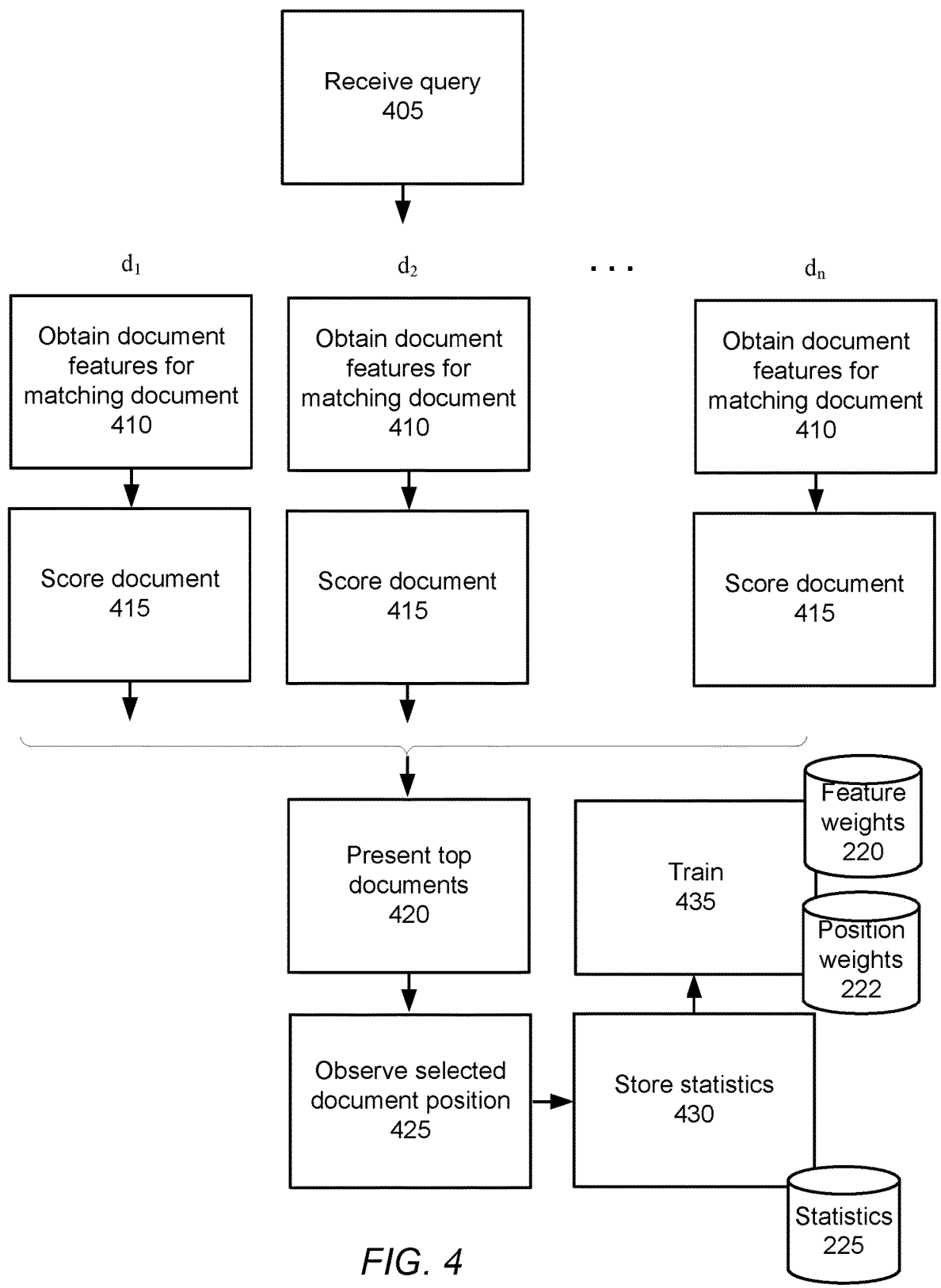
FIG. 4 illustrates the obtaining of data used for training the model represented by document feature weights and position weights, and the performing of that training, according to one embodiment.

FIG. 4 illustrates the obtaining of data used for training the model represented by the weights 220, and the performing of that training, according to one embodiment. A search query is received 405 from a user, and document features for a set of n documents matching the search query are obtained 410 from the index 202. Each document is scored 415. The scores can be computed as unweighted averages of the document feature values extracted by the feature derivation module 205, or (if the feature weights 220 and position weights 222 have been previously computed and are thus currently being recomputed) by using the scoring module 212 as described above with respect to FIG. 2 to obtain document feature values and applying the feature weights 220 to those values. The n documents with the top relevance scores are presented 420 to the user in a set of search results. When the user selects one of the presented documents, the position of the selected document is observed 425 and statistics about the selected document (such as its unique identifier, and/or its document feature values), as well as its position, are stored 430 in the statistics repository 225. Steps 405-430 are repeated, typically for different search queries and/or different users.

After some period of time, or after some amount of statistics have been accumulated, a model (the feature weights 220) is trained 435, as described above with respect to the training module 250 of FIG. 2. The scoring module 212 can then use the computed model to determine true document relevance scores that account for positional biases. This allows the server 100 to provide the user with the documents that are most truly relevant to the user, rather than documents with skewed relevance scores that reflect inherent position biases of users.

Since the position biases may be different for different user interfaces—e.g., user interfaces that visually or otherwise emphasize certain positions more than others, or that merely have a certain aesthetic effect that tends to make the user behave differently with respect to different positions—the training process (e.g., that of FIG. 4) may be performed multiple times for multiple different user interfaces, resulting in a distinct set of position weights 222 for each user interface. The training, and the resulting determination of different position weights 222, can also be used as a tool to assess the effect of different user interfaces and to refine them accordingly. For example, a particular user interface can be used; training can be performed; analysis of the position weights 222 for that user interface can determine that the user interface results in higher than desired position biases; and the user interface can be modified and training performed again to reassess the effect of the (modified) user interface on position biases.

Figure 5:
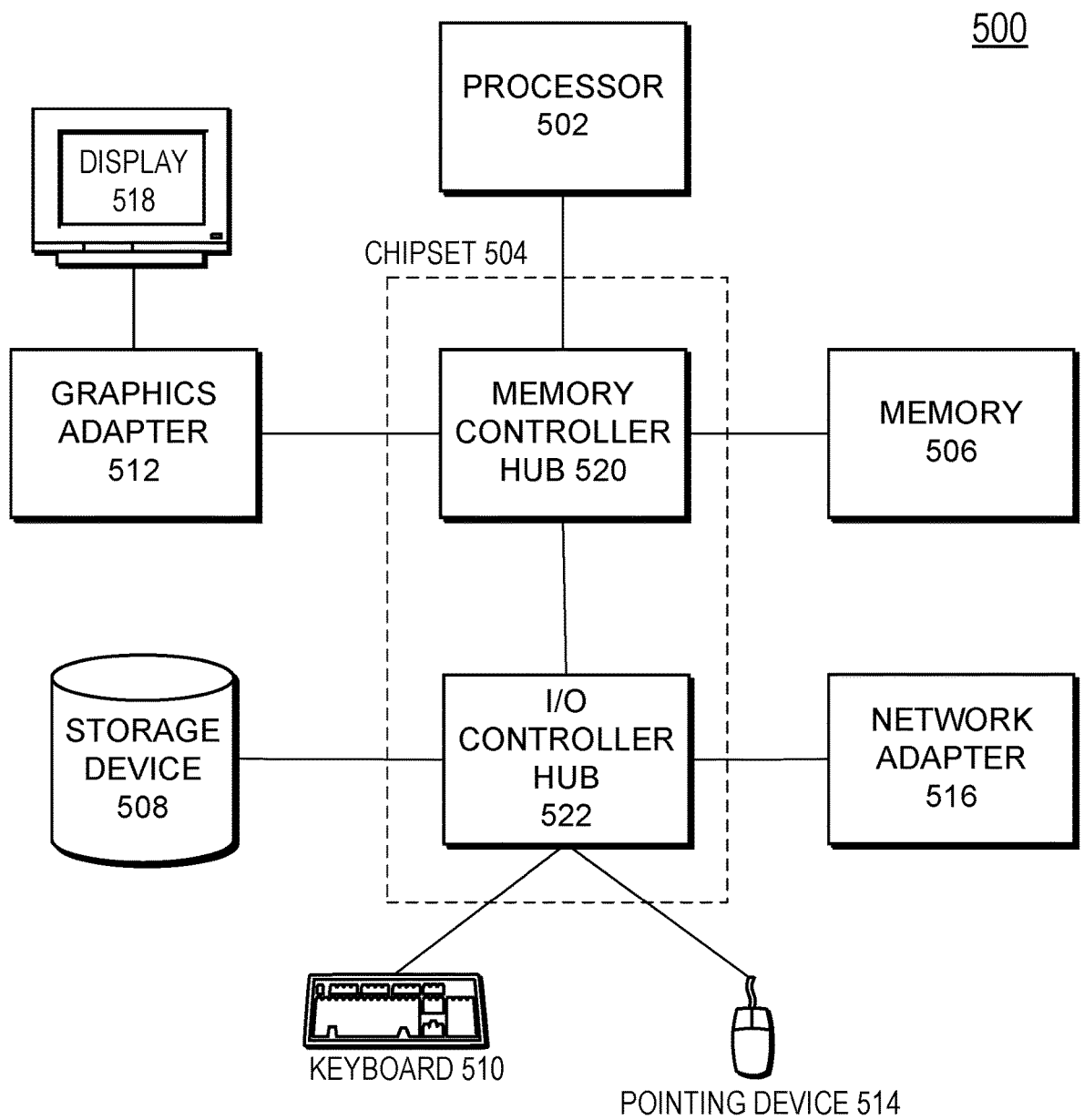
FIG. 5 is a high-level block diagram illustrating physical components of a computer used as part or all of the client or server from FIG. 1, according to one embodiment.

FIG. 5 is a high-level block diagram illustrating physical components of a computer 500 used as part or all of the client device 110 or server 100 from FIG. 1, according to one embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500 acting as a server may lack a graphics adapter 512, and/or display 518, as well as a keyboard or pointing device. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
   accessing query data comprising, for each respective query of a plurality of queries:
     the respective query,
     respective feature values, of each respective document of a plurality of documents presented to a first user in response to the respective query, for each respective document feature of a plurality of document features, wherein the feature values include a number of times a query component of the query appears in content of the respective document, a number of times a query component of the query appears in a title of the respective document, and a number of times that the respective document has been viewed by any user,
     a position of a selected one of the documents selected by the first user within query search results, and
     a user interface type corresponding to a user interface used by the first user to select the selected one of the documents;
   performing machine learning to compute:
     document feature weights to apply to feature values of each of the plurality of documents to determine relevances of each of the plurality of documents to users, and
     positional bias values that when combined with the determined relevances represent probabilities that users will click on each of the plurality of documents when the plurality of documents are presented at given positions within search results for a given query, the positional bias values being adjusted based on the user interface type;
   receiving a query from a second user from a user interface having a second user interface type;
   identifying matching documents matching the query;
   determining feature values of the matching documents;
   determining relevance scores of the matching documents by applying the computed document feature weights to the determined feature values of the matching documents and adjusting the relevance scores based on the second user interface type; and
   presenting the matching documents to the second user in an order based on the determined relevance scores.

2. A computer-implemented method comprising:
   accessing query data comprising, for each respective query of a plurality of queries: the respective query, respective feature values, of each respective document of a plurality of documents presented to a first user in response to the query, for each respective document feature of a plurality of document features, a position of a selected one of the documents selected by the user within query search results, and a user interface type corresponding to a user interface used by the user to select the selected one of the documents, wherein the feature values include a number of times a query component of the query appears in content of the respective document, a number of times a query component of the query appears in a title of the respective document, and a number of times that the respective document has been viewed by any user; and
   performing machine learning to learn feature weights to apply to values of document features of each of the plurality of documents to determine relevances of each of the plurality of documents to users, and to learn positional bias values that when combined with the determined relevances represent probabilities that users will click on each of the plurality of documents when they are presented at given positions within search results for a given query, the positional bias values being adjusted based on the user interface type.

3. The computer-implemented method of claim 2, further comprising:
receiving a query from a second user;
identifying matching documents matching the query;
determining document feature values of the matching documents;
determining relevance scores of the matching documents by applying the learned feature weights to the determined document feature values of the matching documents; and
presenting the matching documents to the second user in an order based on the determined relevance scores.

4. The computer-implemented method of claim 2, wherein the query data was obtained from search results presented in a first user interface, and wherein the computer-implemented method further comprises modifying the user interface based on the positional bias values.

5. The computer-implemented method of claim 2, wherein the machine learning is performed using neural networks.

6. A non-transitory computer-readable storage medium storing instructions executable by a computer processor and comprising:
instructions for accessing query data comprising, for each respective query of a plurality of queries: the respective query, respective feature values, of each respective document of a plurality of documents presented to a first user in response to the query, for each respective feature of a plurality of document features, a position of a selected one of the documents selected by the first user within query search results, and a user interface type corresponding to a user interface used by the first user to select the selected one of the documents, wherein the feature values include a number of times a query component of the query appears in content of the respective document, a number of times a query component of the query appears in a title of the respective document, and a number of times that the respective document has been viewed by any user; and
instructions for computing feature weights to apply to values of document features of each of the plurality of documents to determine relevances of each of the plurality of documents to users, and for computing positional bias values that when combined with the determined relevances represent probabilities that users will click on each of the plurality of documents when they are presented at given positions within search results for a given query, the positional bias values being adjusted based on the user interface type.

7. The non-transitory computer-readable storage medium of claim 6, further comprising:
receiving a query from a second user;
identifying matching documents matching the query;
determining document feature values of the matching documents;
determining relevance scores of the matching documents by applying the learned feature weights to the determined document feature values of the matching documents; and
presenting the matching documents to the second user in an order based on the determined relevance scores.

8. The non-transitory computer-readable storage medium of claim 6, wherein the query data was obtained from search results presented in a first user interface, and wherein the instructions further comprise instructions for modifying the user interface based on the positional bias values.

9. The non-transitory computer-readable storage medium of claim 6, wherein the machine learning is performed using neural networks.

* * * * *

UNITED STATES PATENT AND TRADEMARK OFFICE
CERTIFICATE OF CORRECTION

Page 1 of 1

PATENT NO. : 10,565,265 B2
APPLICATION NO. : 15/292033
DATED : February 18, 2020
INVENTOR(S) : Zachary Alexander It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 254 days.

Signed and Sealed this
Sixth Day of December, 2022

Katherine Kelly Vidal
*Director of the United States Patent and Trademark Office*